(12) United States Patent
Luo

(10) Patent No.: US 7,313,783 B2
(45) Date of Patent: Dec. 25, 2007

(54) GENERIC MANAGEMENT SOFTWARE APPLICATION FOR ALL INDUSTRIES AND METHOD THEREOF

(76) Inventor: Zhaoji Luo, 42632 Charleston Way, Fremont, CA (US) 94538

( * ) Notice: Subject to any disclaimer, the term of this patent is extended or adjusted under 35 U.S.C. 154(b) by 336 days.

(21) Appl. No.: 10/434,580

(22) Filed: May 8, 2003

(65) Prior Publication Data

US 2003/0210269 A1 Nov. 13, 2003

Related U.S. Application Data

(60) Provisional application No. 60/379,180, filed on May 8, 2002.

(51) Int. Cl.
  *G06F 9/44* (2006.01)
  *G06F 17/30* (2006.01)
(52) U.S. Cl. .................. 717/105; 707/101; 707/102; 715/968
(58) Field of Classification Search ............... 707/101, 707/102; 717/105; 715/968
  See application file for complete search history.

(56) References Cited

U.S. PATENT DOCUMENTS 5,980,096 A * 11/1999 Thalhammer-Reyero .... 707/100
2002/0129032 A1 * 9/2002 Bakalash et al. ........... 707/101

* cited by examiner

*Primary Examiner*—Charles Rones
*Assistant Examiner*—Phuong-Thao Cao
(74) *Attorney, Agent, or Firm*—Intellecutal Property Law Group LLP; Otto O. Lee; Juneko Jackson

(57) ABSTRACT

Visual Flow Interface (VFI) is a generic management software tool for any user in different industries which is similar to implementing a Graphical User Interface (GUI) on Database Applications for the front end. VFI revolutionizes the principle of Management Information System (MIS) design and will launch a new generation of MIS. VFI's innovative contribution to MIS includes two key points: (1) A user's specific managerial and technological process is independent from the program of the MIS. Users can design their managerial and technologic process themselves or make any change freely without redesigning the program of the MIS; and (2) VFI focuses on the unique functional common character of different flows in all different industries and designs a visual image "Sandwich" to represent the functional common character. The Sandwich is a very simple idea but solves a very complicated problem for designing a generic MIS.

7 Claims, 15 Drawing Sheets

GENERIC MANAGEMENT SOFTWARE APPLICATION FOR ALL INDUSTRIES AND METHOD THEREOF

CROSS-REFERENCE

This application claims the benefit of priority from U.S. Provisional Application No. 60/379,180 filed May 8, 2002, which is herein incorporated by reference.

BACKGROUND OF THE INVENTION

1. Field of the Invention

This invention relates generally to interfaces for database management applications. More specifically, the invention relates to a visual interface for database management which allows a user to design, manipulate and view production processes of any industry and manage input and output data from any existing database without having to program specific database management applications or continually update the program. The invention provides flexibility in database management by allowing it to be applied to any industry process.

2. Description of the Related Art

From MIS (Management Information System) to ERP (Enterprise Resource Plan) to ASP (Application Service Provider), management software has been changing its face, and consequently, it has become larger and more complicated. However, the principle behind MIS design has never been changed internally.

A MIS includes two main parts: (1) The Applied Database and (2) the Application Program (which is based on the applied database).

First, the Applied Database is only responsible for Data Management. Managers can manage their business by relying on the data in a database, but if the idea of a process is still in their mind and not in the software, the system cannot function as a true MIS. The Data Management, must rely on the user's specific Database System and Applied Database Structure.

Secondly, the Application Program, must fit the user's Organization and Structure, and must include the idea of a process in its program for Production Management. There are two kinds of processes included in early MIS's application program: Managerial Process and Technological Process.

Overall, an MIS must rely on the user's three specific conditions:
(1) User's specific Database System and Applied Database Structure;
(2) User's specific Organization and Structure on production;
(3) User's specific Managerial Process and Technological Process.

To design a specific MIS, the software company must research and understand the user's three specific conditions, and then write these conditions into a particular program. This results in four disadvantages to the user:
(1) Long development period;
(2) High costs;
(3) No secrets;
(4) Always updating a new version of an MIS program to follow the changes of the user's three specific conditions.

Unfortunately, the user's three specific conditions are constantly changing and thus perpetuating the four disadvantages. Essentially, the four disadvantages are the four original problems in MIS design.

ERP (Enterprise Resource Planning) includes some strategic elements along with technique in its applications, and thus called the Resource Plan. The ERP integrates all areas of the business such as planning, manufacturing, sales, and marketing. However, MIS is still the central element.

ASP includes many ERPs developed for different industries and is implemented from a central data center like a third party company. Therefore, the company can provide its service to all users in these industries through a network, like the Internet.

As shown, there is a hierarchy in which MIS at the bottom of the pyramid, ERP in the middle of the pyramid which includes MIS, and ASP is at the top of the pyramid which includes both ERP and MIS. As a result, all applications based on MIS, ERP or ASP contain the four original problems in their design. MIS' reliance on the user's three specific conditions mentioned brings on the four original problems. Currently, there is a design in one industry for a generic MIS software, with the principle according to the following:
A. Programming based on the common characters of different users' systems in one industry;
B. Setting many choice parameters to include as many of the specific requests as possible from the user's three specific conditions.

However, there are some obstacles to overcome. If one cannot find any common characteristics for all the users' system in all industries, then initiating the first sentence of the program seems impossible. On the other hand, if one is able to create such a comprehensive software package to accommodate all industries, the user must make choices from thousands of parameters, resulting in software that is too inefficient, costly and burdensome. Therefore, many professionals dealing with MIS design find it hard to envision the possibility of designing a truly generic MIS for all industries.

This is the basic principle underlying MIS, ERP and ASP. But, the challenge is to design generic management software that can be applied to all industries.

SUMMARY OF THE INVENTION

This invention provides the solution of having a generic database management system that can be incorporated into any existing system and implemented for use in any industry. It meets the need for lowering costs for database management systems and eliminates the problem of creating specific programs for every different industry and whenever changes in the database management are required.

Even though actual flows (which defines the flow process of input and output data of goods occupying space and time) in different industries are complicated and varied, they can still be divided/into units. Each unit performs a specific function. Each unit in every different flow includes three components on function: an input, a unit body to process the input, and an output. This is true, regardless if the unit is a machine, a truck, a flight, an operator, a group, a department or a company.

This invention provides a generic visual flow interface. Any industry, any company, any group and any person who needs to manage more than one process will find it useful and convenient. Visual Flow Interface's features make it much more advantageous over traditional MIS design. VFI's key feature as a "one size fits all" system has the potential for being the model for the new generation of MIS in various industries.

To function in a variety of industries, software should:

A. Be programmed based on common characteristics for any user's system in all different industries;
B. Set a large number of choice parameters to include all possible specific requests from all users' three specific conditions.

Economically speaking, an embodiment of the present invention is only approximately 1/10 the cost of traditional MIS. Therefore, cost benefits of VFI will result in reorganizing the whole management software market.

One object of the present invention is that it solves the problem in traditional MIS design of having to determine the database management system before designing the MIS. In traditional MIS design, once the database management system is substituted or no longer used, the MIS will become useless. The present invention resolves this problem by providing a set of interfaces for any database.

Another object of the present invention is that users can set the mapping from their database to the VFI of the present invention. This advantage, thereby eliminates the problem in traditional MIS design of first having to design the applied database structure in order to design the database application in reliance on the structure.

Another advantage of the present invention is the versatility and convenience it offers whereby the VFI remains in the front end. This is unlike traditional MIS design where the MIS must fit the user's organization and structure while the database structure and database application remains in the back end.

Moreover, the present invention has the advantage of adaptation to any change in an industry process by allowing the user to design and adapt to the change using the VFI. This is not the case in traditional MIS design where changes or updates to a process require the underlying program of the MIS to be changed or updated too.

VFI is a very friendly interface and easy to use. There is no complicated system that requires professional training, thus allowing all managers to implement and maintain it step by step with documented help.

As described, there is a large difference between VFI and traditional MIS design. VFI accommodates any type of industry and can accommodate any change necessary without requiring the purchase of new MIS designs. Traditional MIS designs requires a constant update whenever a new system, structure or process is used and results in highly inefficient and expensive new programs. The flexibility of VFI is its advantage by quickly and inexpensively adapting to any user's required needs.

In addition, an object of the embodiment of the present invention is a method and application of creating a multi-level, multi-platform hierarchical organization using the VFI to design, manage, organize and display database contents of multiple processes in a large-scale system. The VFI allows for managing a number of units representing servers or an end which comprises of a Sandwich. This Sandwich is made of an input displayer, the body and the output displayer. The VFI connects the units through a network structure through a connection to the Internet or an intranet wherein the input displayer can be up level IP addresses, the body contains information and data in local files and the output displayer is the down level IP addresses. A user can view the hierarchical organization of a number of processes and both visit and manage the processes directly on a screen conveniently and comprehensively.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

The embodiment of the present invention is a visual flow interface used to design and display the different industry processes organized in a database management system. The invention functions as a database application and runs with a database structure, either already existing or provided with the visual flow interface software.

The key point of the invention is that it transfers the functional structure of a particular process of flow called the unit into a geometric structure, and then creates a visual image for the generic structure of any unit in any flow.

Figure 1:
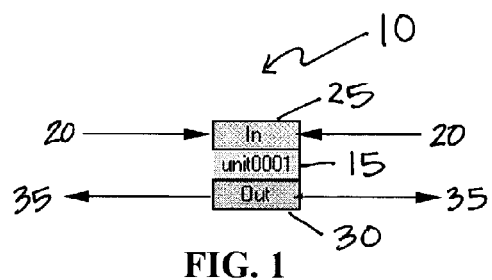
FIG. 1 illustrates a generic structure of a unit of flow as displayed on a computer screen when designing with the embodiment of the present invention.

As shown in FIG. 1, a unit (10) of flow is comprised of a unit body (15) for processing input data (20) and handling all information about the unit (10) in an actual flow (45) recorded in a database, an input displayer (25) displaying input values of something moving in the unit, and an output displayer (30) showing the output data (35) of something moving out of the unit. It looks like a Sandwich as shown in FIG. 1. The Sandwich represents the unit (10) as an image.

Figure 5:
FIG. 5 illustrates some examples of different industry applications which can be units for the embodiment of the present invention.
Figure 5:
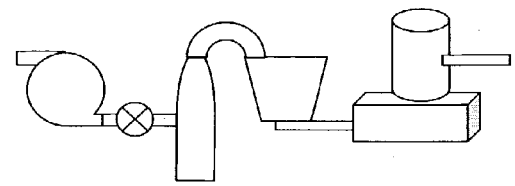
Figure 5:
Figure 5:
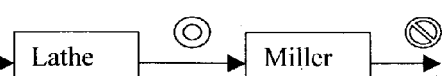
Figure 5:
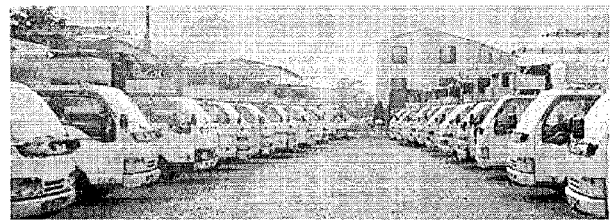
Figure 5:
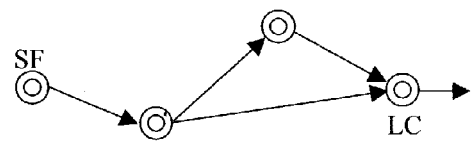
Figure 5:
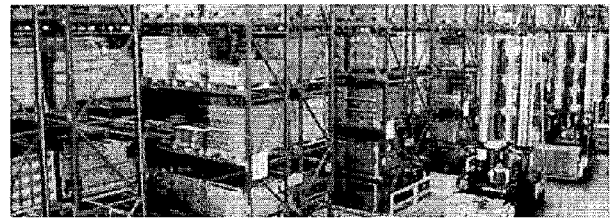
Figure 5:
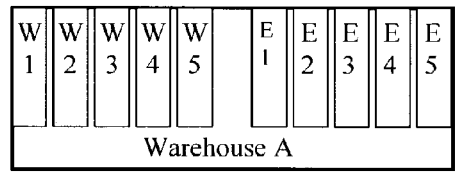
Figure 5:
Figure 5:
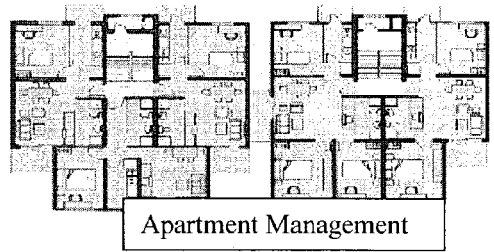

In essence, this visual image represents a Unit (10) in an actual flow (45) such as a machine, an operator, a group, a company, and then such items as materials, money, or information that can move into or out of the Unit (10). As shown in FIG. 5, there are different industry applications that can implement the use of units (10). Actual Flow (45) means a flow took time and space, and its occurrence could be recorded in a database.

Figure 6:
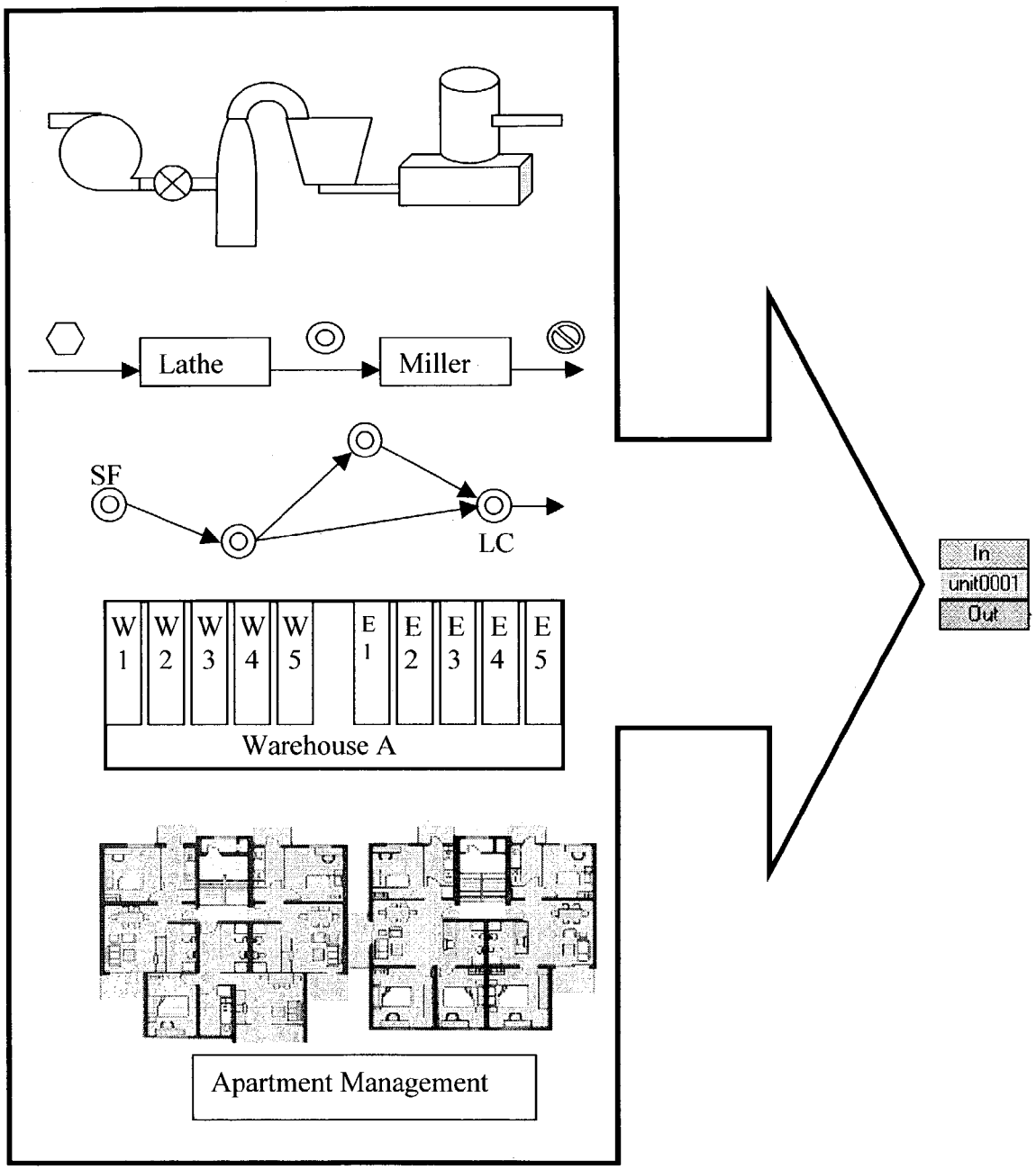
FIG. 6 illustrates how the examples of FIG. 5 can be represented as flows and be designed and displayed as a visual image showing a unit of the embodiment of the present invention.

As FIG. 6 illustrates, the units (10) in all these flows are different in terms of their physical feature or geometric structure. The unique common character is based on function: every unit (10) in the flows includes an input data (20), a unit body (15) for processing the input data (20) and an output data (35) from the processing. Once this is established, the next step is to design a visual image to represent the unique common character. A simple result is that the graphic looks like a Sandwich. If one wants to design a program to process all different kinds of flow, then one designs the program around the Sandwich because it represents the unique common character of all flows.

Figure 2:
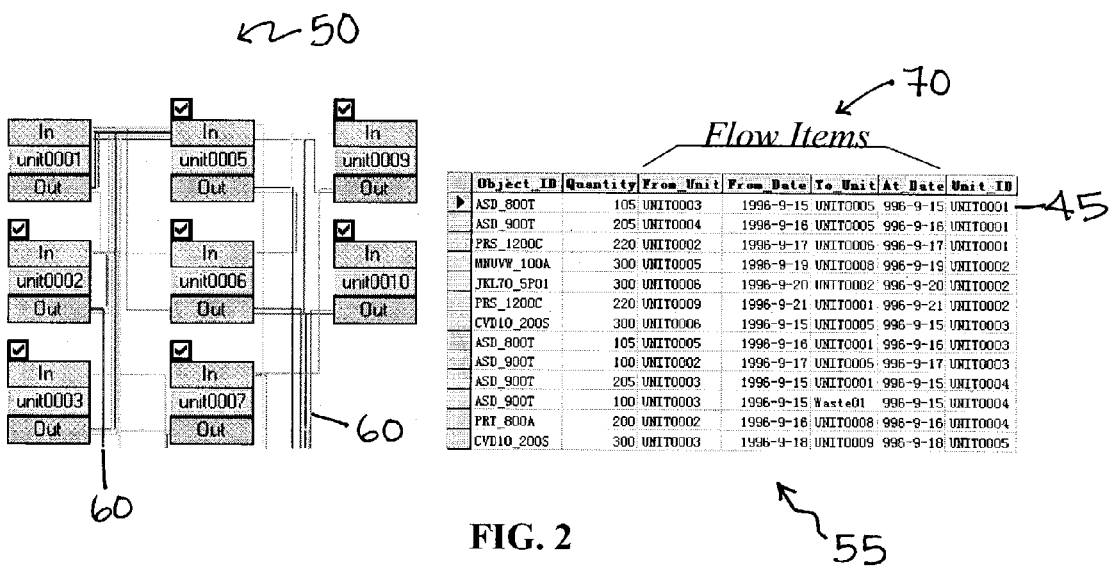
FIG. 2 is an example of VFI production flow management in which the present invention is embodied.

In the second step, VFI can load a visual image to represent an Actual Flow (45) recorded in a database. FIG. 2 gives an example of VFI depicting the visual image of the production flow (Left) (50) versus the database-recorded procedure (Right) (55).

VFI connects all flow lines (60) between all pieces of the Sandwich automatically by the Flow Items (70) of the database. As shown, the simple Sandwich can visually represent any Actual Flow (45) in all different industries, and this enables managers to visually watch any Actual flow (45) on their screen.

Figure 3:
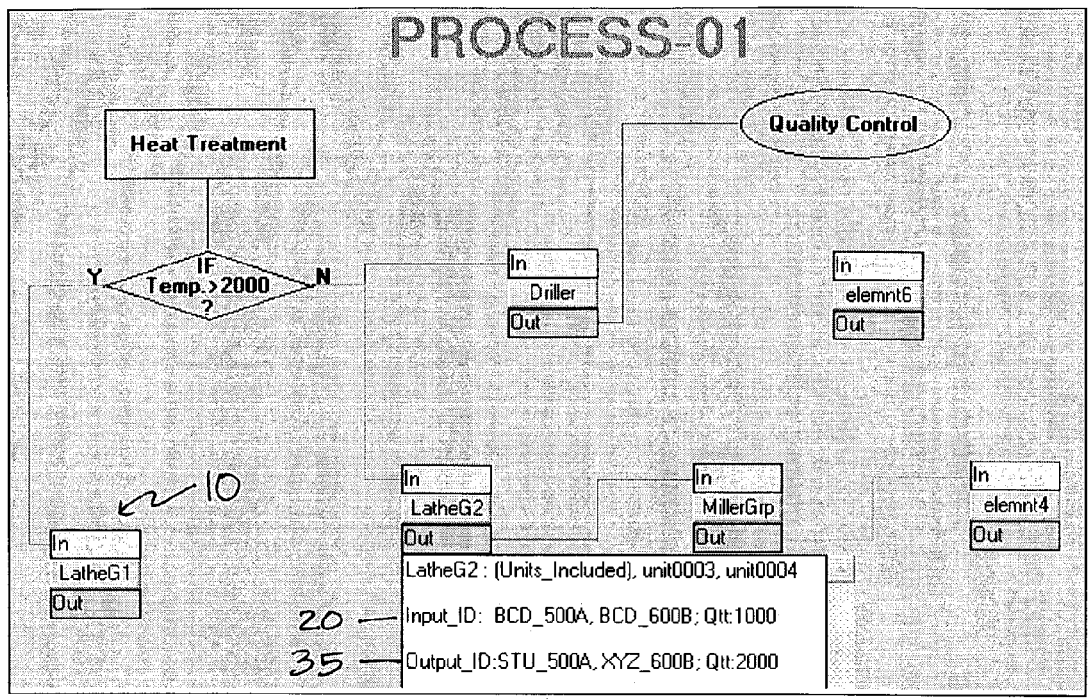
FIG. 3 is an example of the tool graphical user interface to design and set specific processes of flow in which the present invention is embodied.

In the third step, VFI provides a tool graphical user interface (GUI) (75) for users to design their specific managerial and technological process. However, it is not a normal tool for designing a flow chart, but rather it must include the Sandwich as a unit (10) and set all parameters for its Input data (20), Output data (35) and the Unit Body (15) with the relational Actual Flow (45). FIG. 3 is a sample of the GUI (75).

FIG. 3, illustrates a specific technologic process as created by a user and eventually saved in a process database. The GUI (75) is used to design the theoretical flow which is generic and must be set up in the process database in order to control an actual flow (45). An actual flow has its own actual flow database as well (controlled by the process database). In using the GUI, a user can indicate the contents of the units (10) with relational actual flow. Relational actual flow is relational to a specific user-specified process as saved in the process database. For example, looking at LatheG2 in FIG. 3, it includes unit 0001 and unit 0002, with its input data (20) set at BCD__500A and BCD__600B, with quantity of 1000, and the output data (35) set at STU__500A, XYZ__6008, with quantity of 2000. An example condition set here is "Temp.>2000". The user sets the relational database name and its path and includes user-defined conditions. Essentially, the relational database monitors the actual flow database in relation to the process database. (See also FIG. 13). It further records the actual flow.

Finally, VFI saves the user's process design and all contents into a process database as mentioned, which allows the user to implement their own specific process to monitor and control the Actual Flow (45).

Traditional MIS design incorporates the user's process in the program, but VFI does not require any of the user's process in its program. VFI allows users to do so themselves, thereby making VFI highly flexible to changing needs. When a managerial or technological process controls change, traditional MIS programs must change to fit the new process, while VFI never needs to change its program.

VFI is completely generic because the program is independent from the:

(1) User's specific applied database structure;
(2) User's specific organization and structure;
(3) User's specific managerial and technologic process.

These items comprise the biggest difference between VFI and traditional MIS design.

Figure 4:
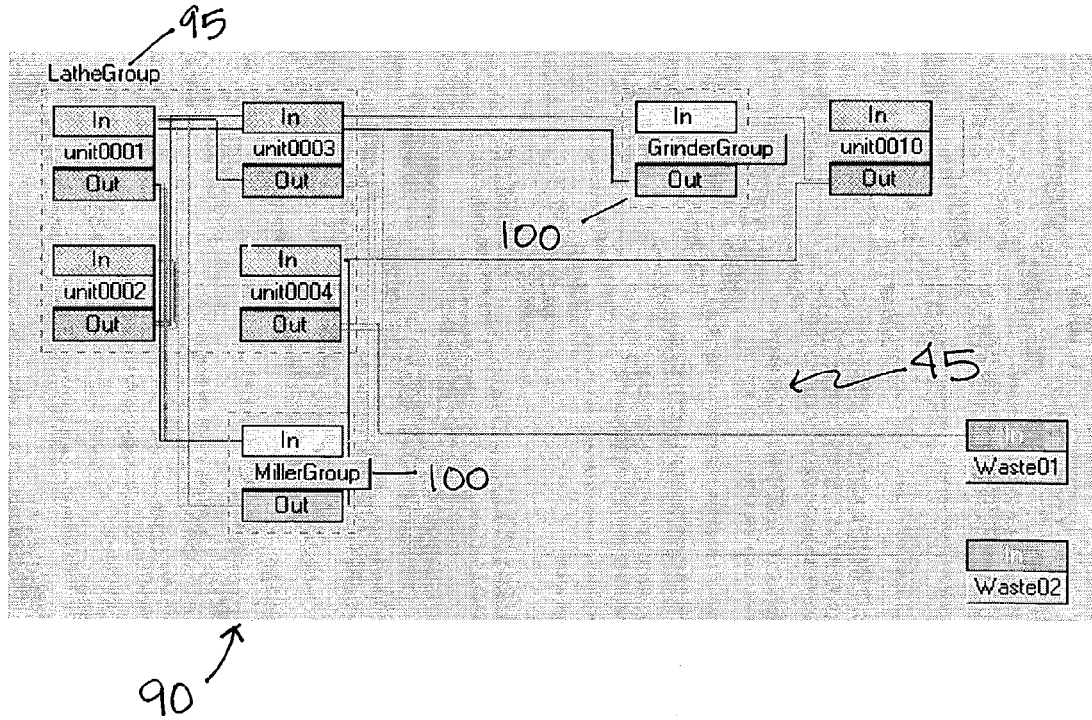
FIG. 4 is an example of the free grouping feature of the embodiment of the present invention.

Furthermore, VFI includes another special function that is called free grouping (90). This is a development on a database application as illustrated in FIG. 4, which shows the grouping feature of VFI. The visual images of units (10) can be grouped to form a group Image, also known as an opened group (95), and then can be "Closed" to form a single Group Unit, also known as a closed group (100).

FIG. 4 shows an actual flow (45) of an opened group (95) (Lathe Group), the group that has multiple visual units (10). There are also two closed groups (100) (Miller Group and Grinder Group), the groups that have one visual representation called group unit (100). The group units (100) could be grouped again into a higher level of groups in a hierarchical structure. The grouping feature of VFI enables managers to easily retrieve information at different levels of the hierarchical structure of the production organization. Managers can group and layout the GUI (75) as they see fit, then save it for everyday use. Such a free grouping function (90) is not available in the current software market.

VFI is a GUI (75) that remains in the front end facing the user. The present embodiment of VFI version 2.X is designed for Windows' users. A business may install it as a Windows Application for every front end PC. If the business already has an existing MIS, VFI will never disturb the MIS's performance, allowing users to have the option of using both VFI and the existing MIS to manage production. VFI's users may compare VFI with an existing MIS to find the differences of function between the two. Users will find that VFI eliminates the four original problems of traditional MIS, and converts them into the four new advantages for users: (1) Zero development period; (2) Low cost; (3) No disclosure of business secrets to a software company; and (4)No need for updating VFI's program to allow for the changes of a user's three specific conditions.

VFI has a complete set of Data Management tools. A user can enter, edit, delete, or update the data with a user-friendly GUI (75). A user may do statistics and various calculations with the data. A user may create many kinds of charts and graphs from the data as well as design and print report forms. The present embodiment of VFI uses an Access based working database that could be used to save all intermediary results. In addition, if a small business has no existing database system, VFI's working database is an ideal choice.

Figure 7:
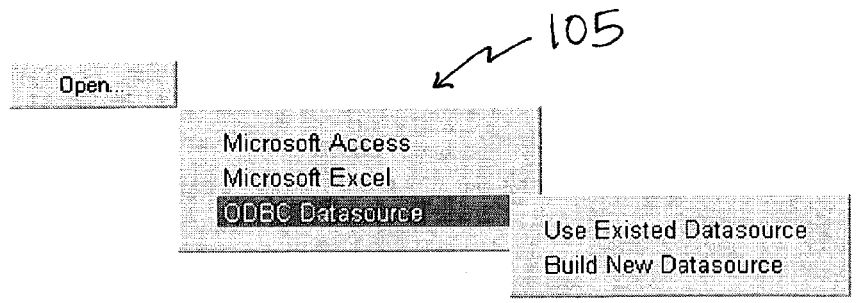
FIG. 7 illustrates an example of a database interface for opening various databases of the embodiment of the present invention.

For real production management, VFI provides a set of new functions to help a user to manage visually and conveniently. A user may open a table or sheet including data in a database (105). VFI is a database application; therefore an applied database structure is the foundation. VFI uses a set of interfaces to popular databases such as FoxPro, Paradox, dBase, Access, as well as spreadsheet Excel. VFI can connect databases through Open Database Connectivity (ODBC) to open databases such as Oracle and SQL Server. Once a database (105) is opened by VFI, the user can implement VFI to manage the items recorded in the database (105). FIG. 7 illustrates how various databases may be opened through a database interface. VFI therefore provides a set of GUI (75) for mapping from a database (105) to an actual flow (45) chart.

Figure 8:
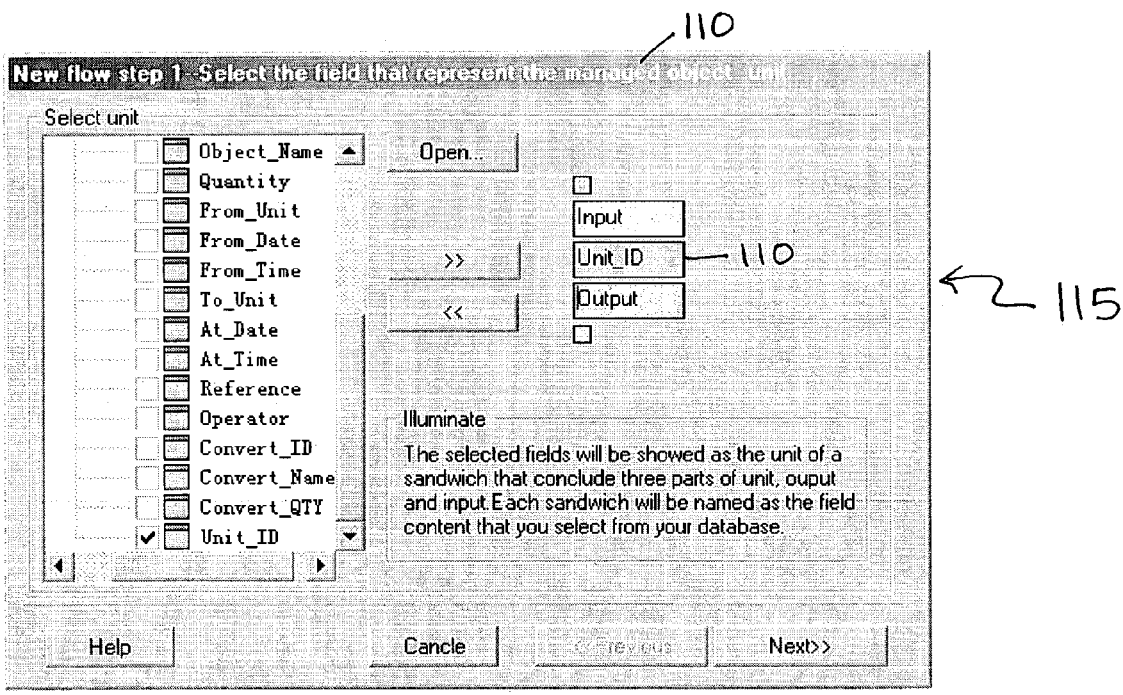
FIG. 8 illustrates an example of a dialog box for setting the fields in a data source as the managed object that will be represented on screen by a unit body "sandwich" of the embodiment of the present invention.

FIG. 8 illustrates the dialog box that allows the user to indicate a managed object (110) which is the unit's ID. A user then utilizes a dialog box (115) to set a field in the data source as the managed object (110) that will be represented by the Sandwich on screen. A managed object (110) may be any entity: a machine, a flight, a warehouse, an operator, a group or a company, for example. FIG. 8 illustrates the dialog box that allows the user to indicate a managed object (110).

Figure 9:
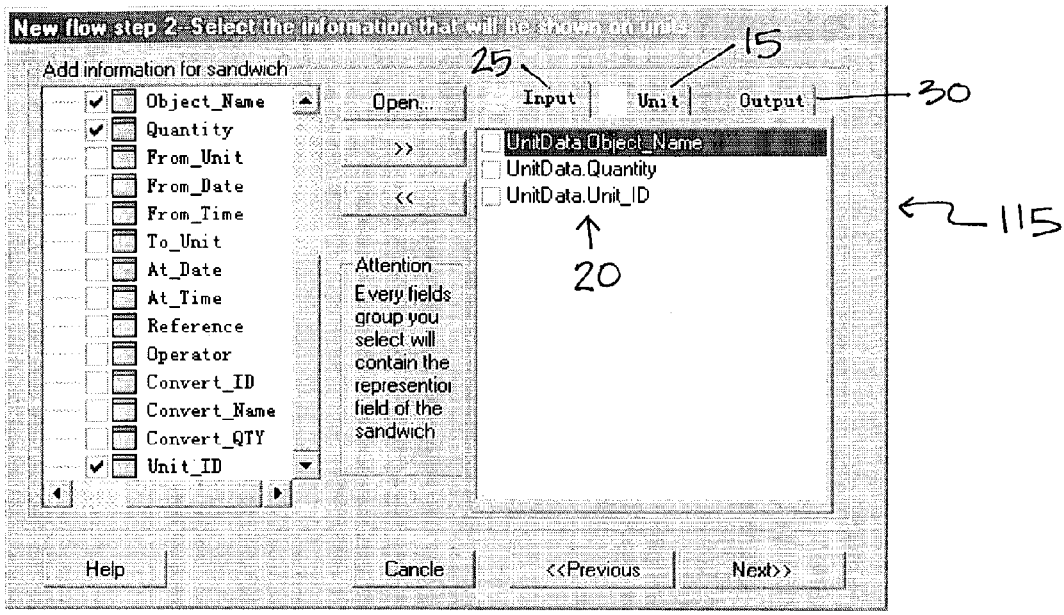
FIG. 9 illustrates an example of a dialog box for setting the field in a data source to display current messages (from newer records) on Input, Output and Unit Body of the embodiment of the present invention.

A user opens a dialog box (115) as illustrated in FIG. 9, to set all fields in the data sources to display current messages on input data (20), the output displayer (30) and unit body (15) of the Sandwich are also available for viewing by clicking on the tab. Current messages are the messages from newer records in the database. For example, current messages would be from today's records but not from yesterday's or last week's records. These current messages can roll from right to left on the screen. A user can also open the input, output and the unit database to see the details.

Figure 10:
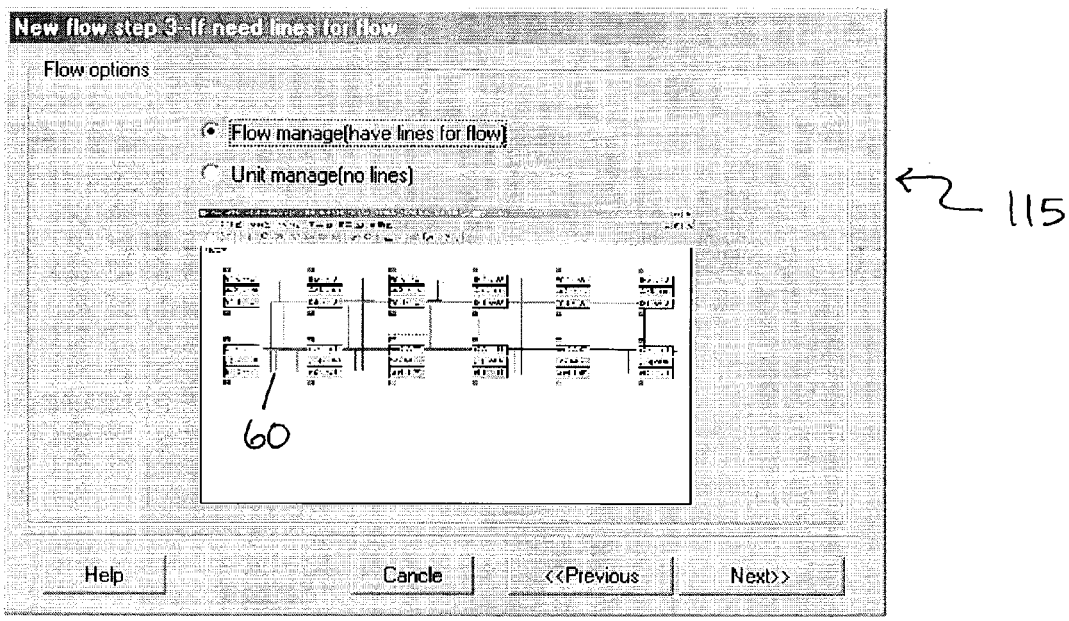
FIG. 10 is an example of a dialog box indicating flow management or unit management of the embodiment of the present invention.
Figure 11:
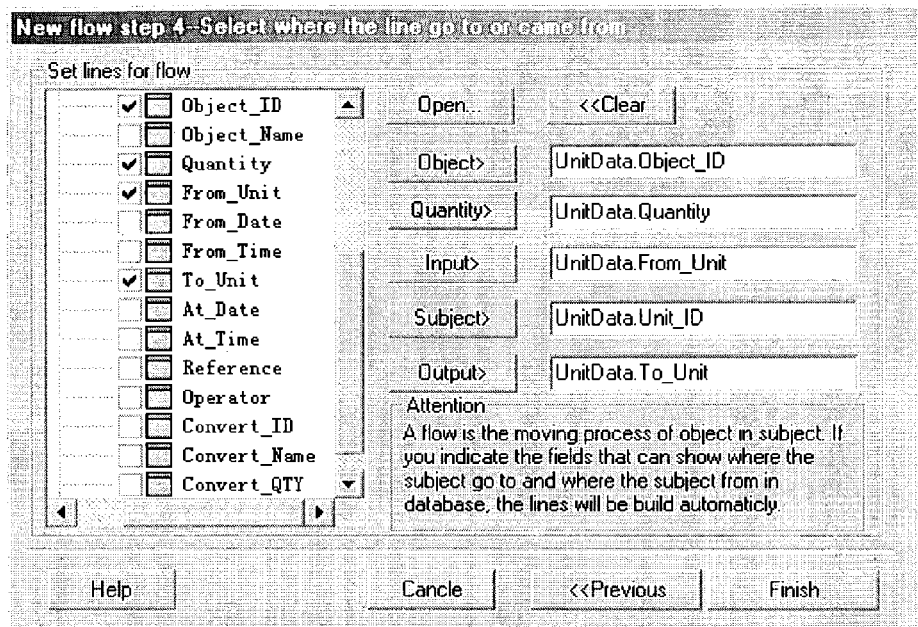
FIG. 11 is an example of a dialog box for setting flow items in a data source to facilitate connecting flow lines between unit bodies or "sandwiches" according to an embodiment of the present invention.

Using a dialog box (115) to set "Flow Items" (70) in the data source helps in connecting flow lines (60) between Sandwiches if there are items (70) flowing between units (10). FIG. 10 illustrates this situation, which is called flow management. On the other hand, if there is no flow, it will be known as Unit Management. FIG. 11 illustrates the dialog box for setting flow items (70) in a data source for facilitating connecting flow lines (60) between Sandwiches.

Figure 12:
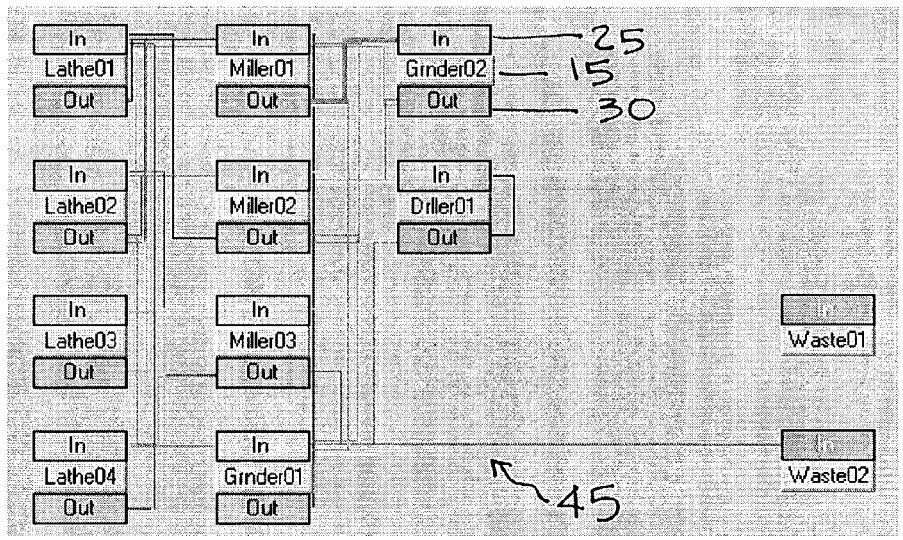
FIG. 12 illustrates a visual flow loaded from a data source as set by the dialog box of FIG. 11, wherein all relational data and tables in a database are connected according to an embodiment of the present invention.

Next, as illustrated in FIG. 12, a visual flow will be loaded from the data source where all relational data and tables in the database have been connected to the Sandwich. The user may double click on the 3 parts: input displayer (25), output displayer (30) or the unit body (15), where relational data will be shown on an opened database window (85) (See also FIG. 13). The loaded actual flow (45) could be saved allowing the user to open it next time without indicating fields again.

Figure 14:
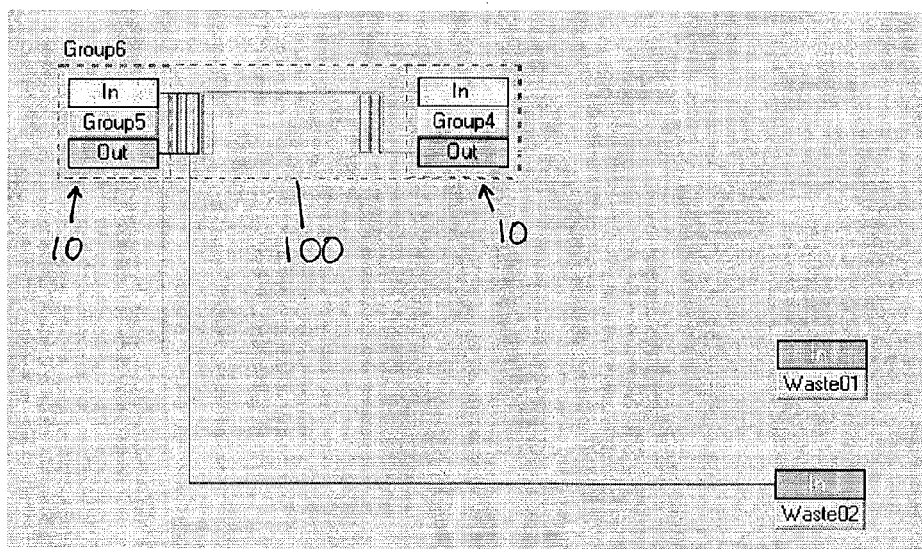
FIG. 14 illustrates a grouping from the actual flow shown in FIG. 4 where units of flow are grouped then closed into a single group unit according to an embodiment of the present invention.

Another feature of the embodiment of the present invention as shown in FIG. 14, allows the user to select some units (10) to group, then combine these grouped basic units (10) into a single group unit (100). This group unit (100) may be grouped again with other units (10) together into a higher level of group. This operation could be done continuously to create a hierarchy. This innovative operation enables different levels of managers to access different GUI and data.

Figure 15:
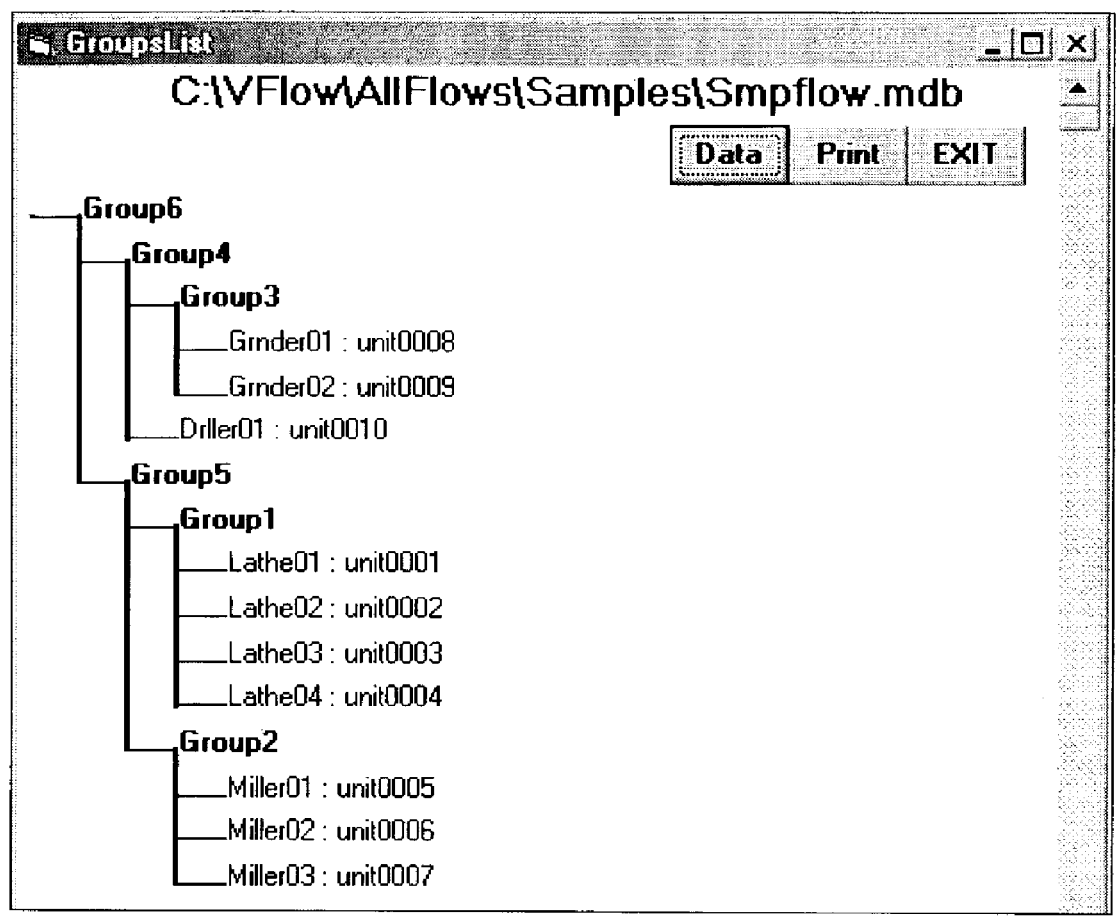
FIG. 15 illustrates the grouping of FIG. 14 as a structure tree according to an embodiment of the present invention.

FIG. 15 illustrates how the grouped units as shown in FIG. 14 can be organized and viewed in a structure tree. Each group unit may be displayed in a hierarchical format and managed conveniently in one screen.

The past process of actual flow (45) recorded in the database can be revisited in real time with the visual flow chart shown on FIG. 12. This function helps managers locate problems that have occurred in past procedures.

With the same process as that for revisiting past process, a production plan could be simulated in real time to obtain a quantitative result, for instance a daily job list.

Figure 13:
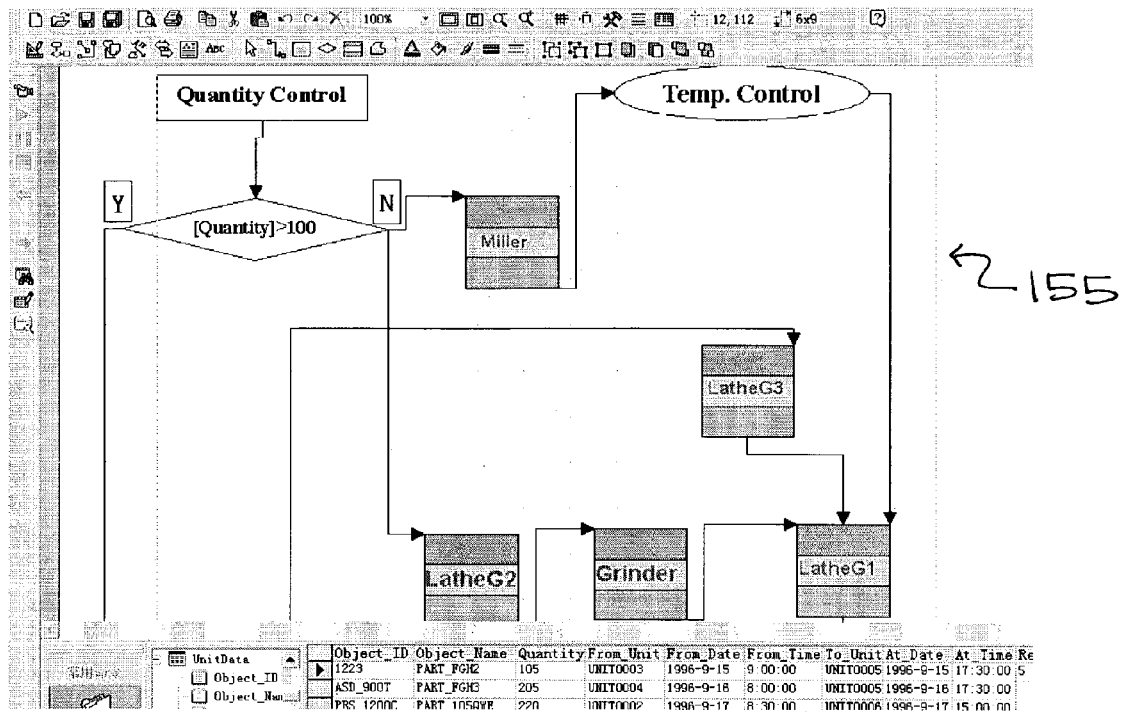
FIG. 13 illustrates a process design interface where a user designs a managerial or technological process; a relational database is viewable as shown at the bottom of the figure, according to an embodiment of the present invention.

The design process of VFI as shown in FIG. 13 allows a user to open a database table that has recorded an actual flow (45). When designing the process, the relational database table (85) (or target database) that will be monitored and controlled by the process must be opened first which is illustrated at the bottom of FIG. 13. This database or table is relational to the managerial or technologic process, as further mentioned in FIG. 3. Based on that relational database table (85), a user can design or change specific managerial and technologic processes with the Process Design Interface (155) of VFI, then set all parameters according to a user's actual production, organization and structure. The designer may test the process with the actual data, then save the design into a Process Database. Each time a user loads the actual flow (45) from the table, the relational database (85) will be opened automatically to monitor and control the actual flow. Every time the relational database (85) is recorded the actual flow (45) is updated; the VFI will check every record, monitor and control the entire procedure with the designed process.

Figure 16:
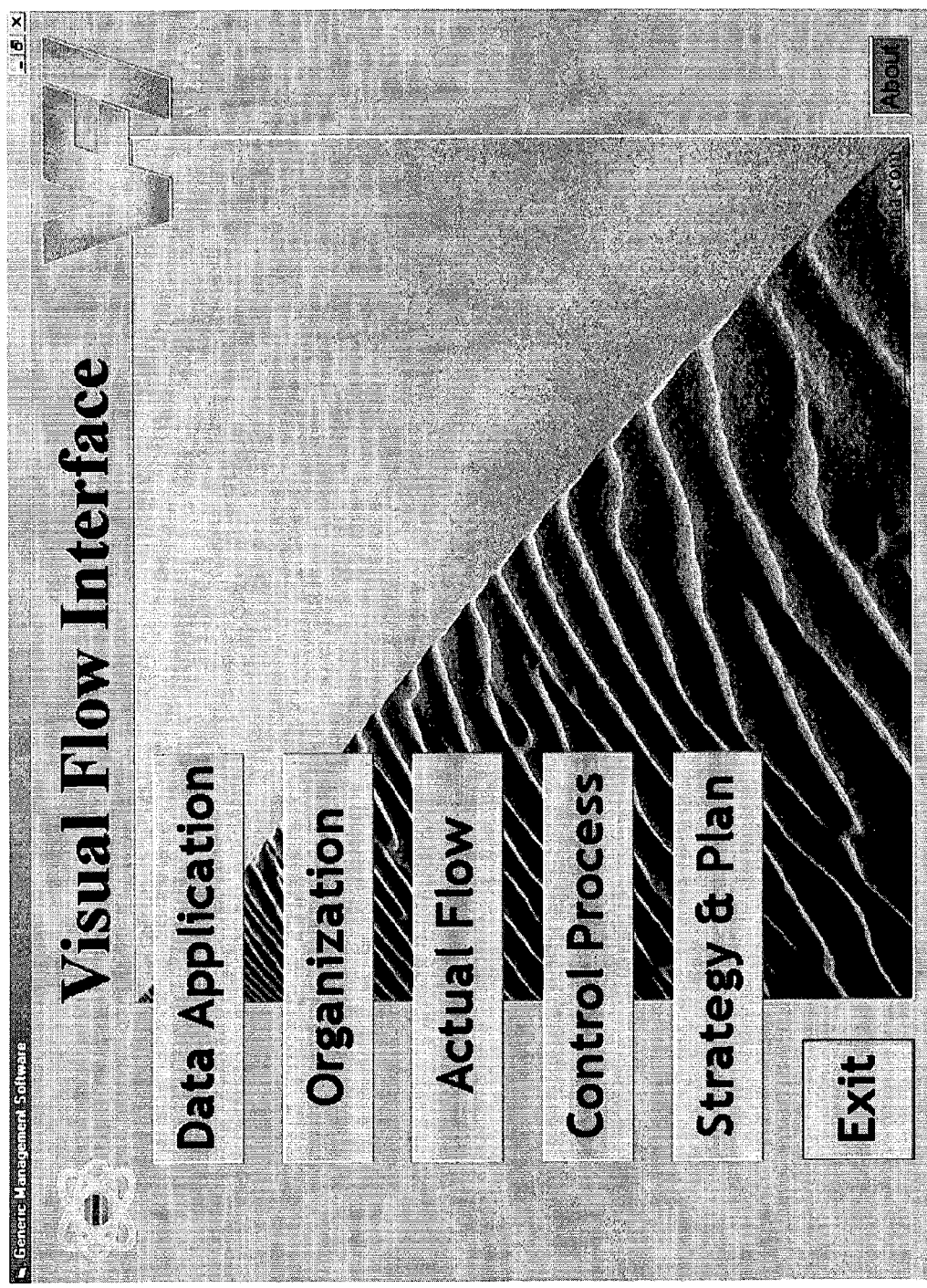
FIG. 16 illustrates a contents portal screen shot of the VFI according to an embodiment of the present invention.

According to FIG. 16, a screen shot is illustrated showing an example of the organization portal to begin using the VFI of the embodiment of the present invention. As shown, the Data Application, Organization, Actual Flow, Control Process, and Strategy & Plan components of the VFI are manipulated and designed visually for any industry. Data Application allows for the design of interfaces using the design GUI wherein any executable file may be run. Actual Flow displays a visual representation of the processes and databases running in the management system. Data may be loaded and grouped automatically from various databases and the history of changes may be displayed. Visual plans including simulated plans, plan tables, efficiency tables may be designed with the VFI to generate a working plan. The Control Process manages and controls the actual flow and traces the results. Any problem in the system can be displayed in the control process component. The control process is user-friendly and need not require any request for a development by a software engineer. This facilitates the user's confidentiality in the control of the management system.

Figure 17:
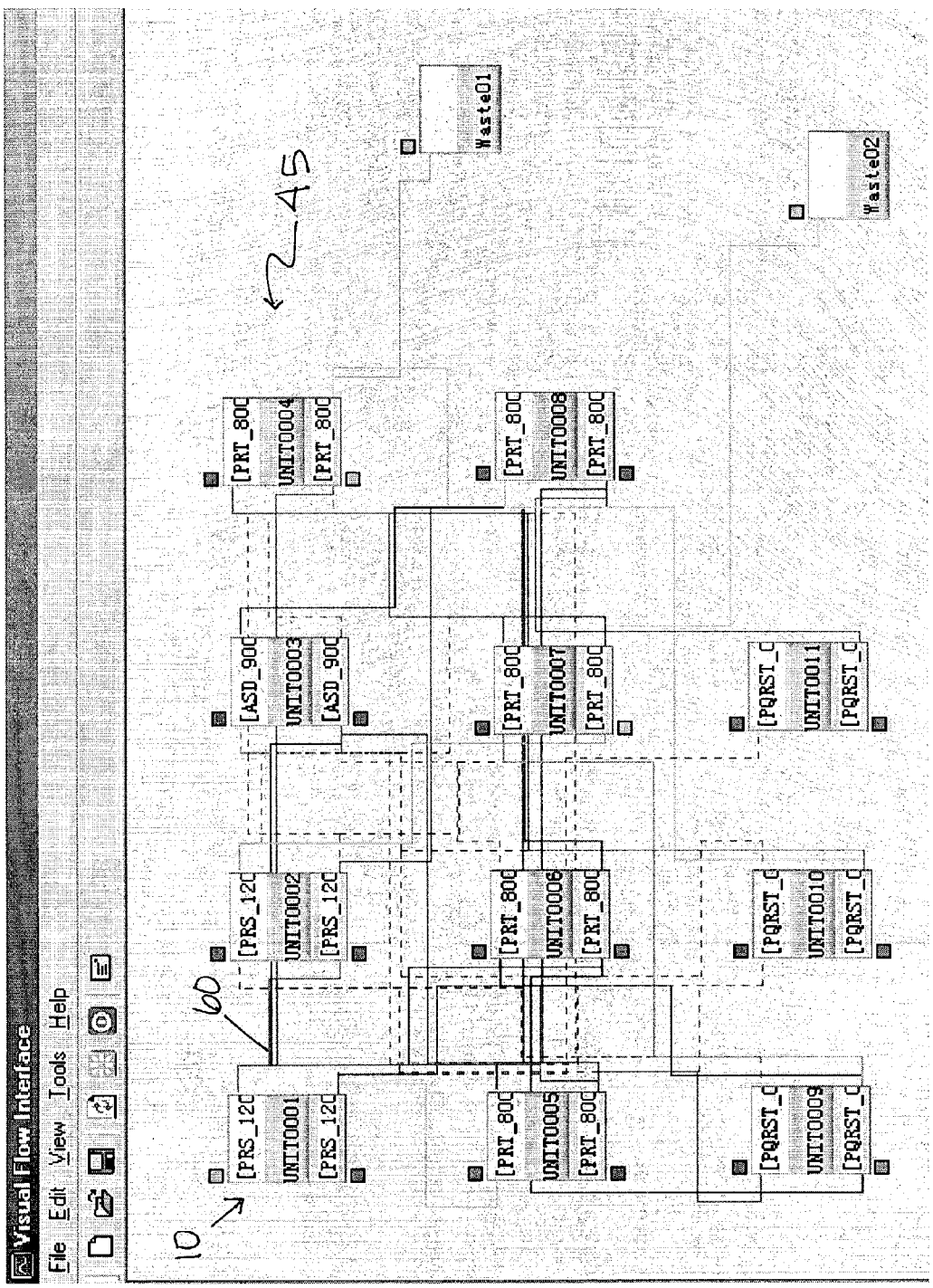
FIG. 17 illustrates another screen shot representing the actual flow of the VFI according to an embodiment of the present invention.

FIG. 17, is another illustration of the actual flow of the VFI according to an embodiment of the present invention.

Again, the flow lines (60) are displayed and each unit (10) may be accessed to display the managed object, input values and output data and the relationship of the unit bodies to each other.

Figure 18:
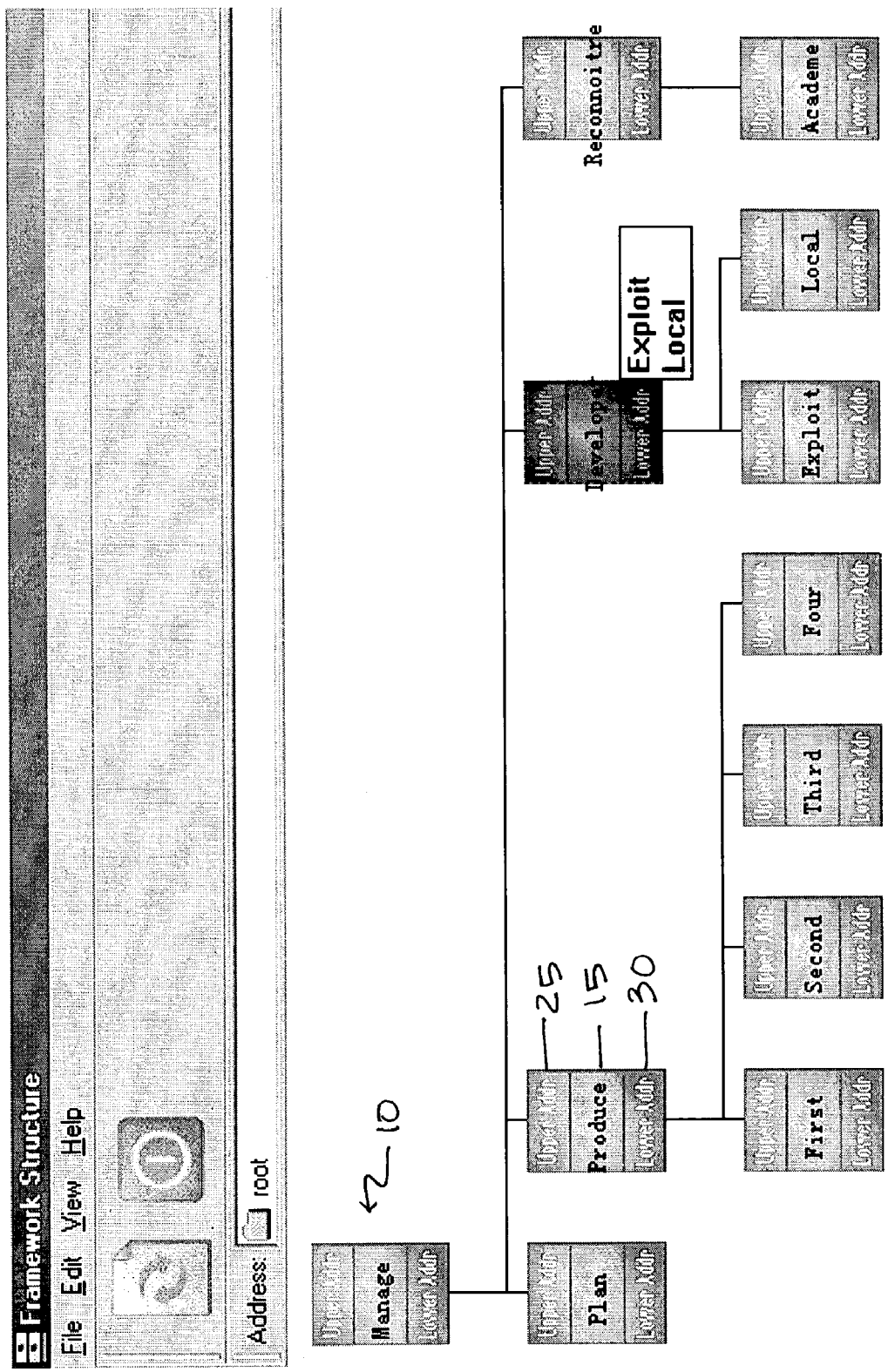
FIG. 18 illustrates the framework structure of the multi-level, multi-platform hierarchical organization created through VFI according to an embodiment of the present invention.

As illustrated in FIG. 18, an embodiment of the present invention is a method and application of creating a multi-level, multi-platform hierarchical organization using the VFI to design, manage, organize and display database contents of multiple processes in a large-scale system. The VFI allows for managing a number of units (10) representing servers or an end which comprises a Sandwich. This Sandwich is made of an input displayer (25), the body (15) and the output displayer (30). The VFI connects the units through a network structure through a connection to the Internet or an intranet wherein the input displayer can be up level IP addresses, the body contains information and data in local files and the output displayer is the down level IP addresses. A user can view the hierarchical organization of a number of processes and both visit and manage the processes directly on a screen conveniently and comprehensively. The VFI may connect all units into group units and combine individual or group units in a visual and manageable hierarchy.

Figure 19:
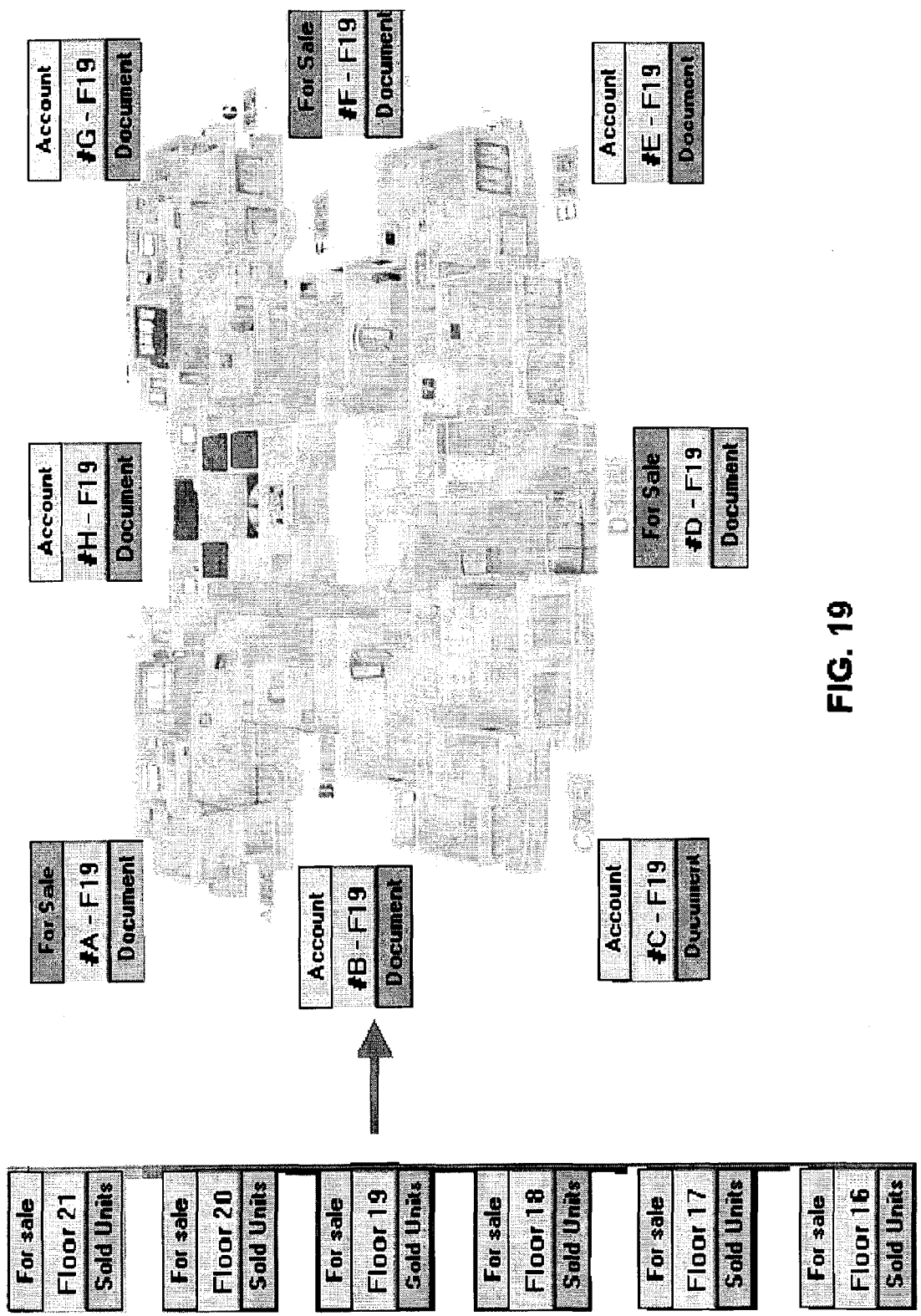
FIG. 19 illustrates an example of using the embodiment of the present invention for managing condominium unit sales.
Figure 20:
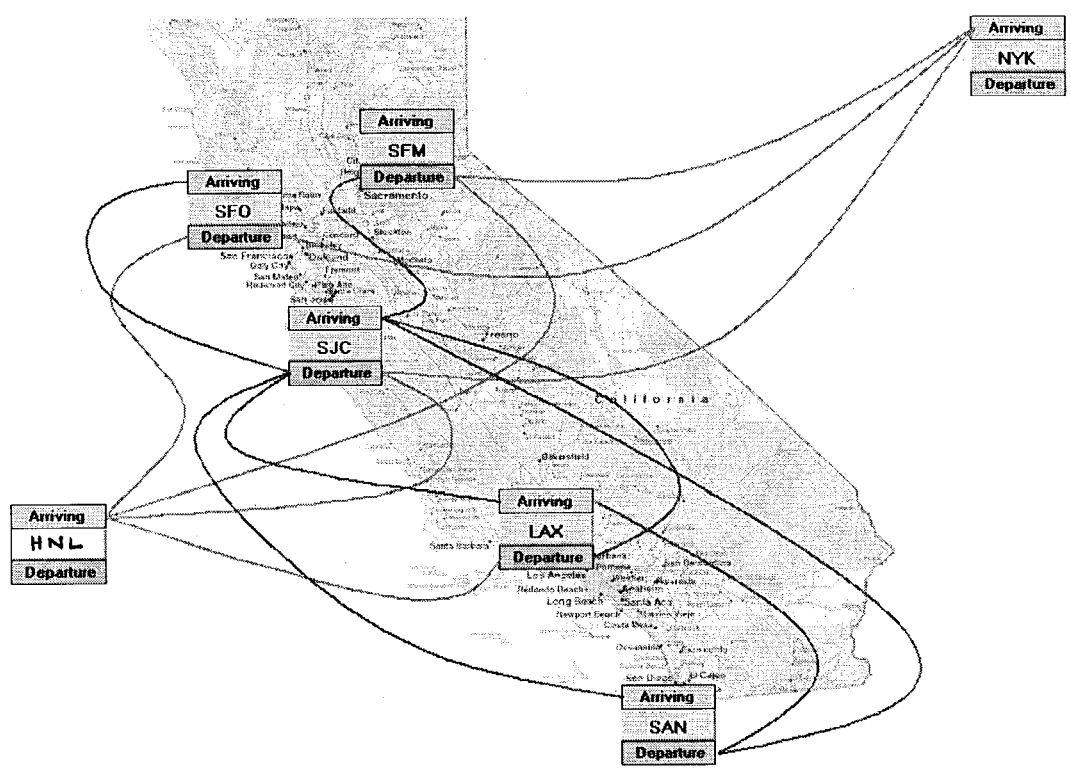
FIG. 20 illustrates an example of using the embodiment of the present invention for the airline industry.
Figure 21:
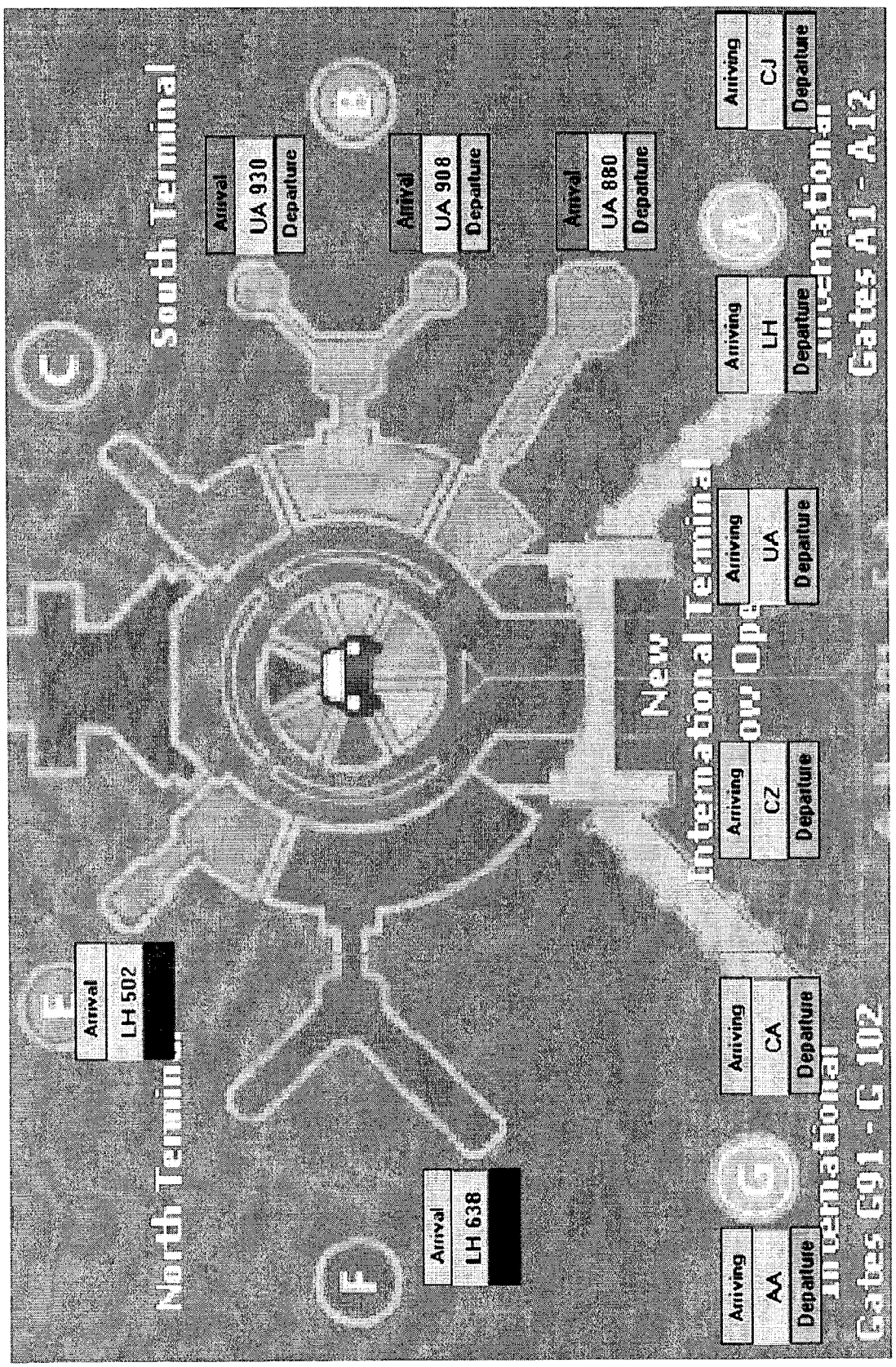
FIG. 21 illustrates an example of using the embodiment of the present invention for airport/terminal management.

FIGS. 19, 20, and 21 are some examples of using the embodiment of the present invention for different industries such as condominium unit sales (FIG. 19), airlines (FIG. 20) and airports (FIG. 21).

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A computer implemented development platform for designing computer-based generic and visual enterprise management software comprising:
   a) a system data source configured to connect to a plurality of databases including at least one existing applied database of information, said system data source made up of a plurality of fields, wherein any one of the fields is selectable as a managed object;
   b) a visual flow interface representing a plurality of units of user-selected-actual flow, each unit of said plurality of units of user-selected actual flow representing a separate managed object and having:
      i) a unit body for processing user-selected input data sources obtained from at least one of the existing applied databases, processing output from user-selected output data sources retrieved from at least one of the existing applied databases, and recording information about said each unit of actual flow in one of the plurality of databases,
      ii) an input display module for displaying the user-selected input data sources and for displaying information about the user-selected input data sources, and
      iii) an output display module for displaying the user-selected output data sources and displaying information about the user-selected output data sources,
   whereby a visual image of said plurality of units of user-selected actual flow is loaded from said system data source for displaying a plurality of information about the user-selected input data sources and a plurality of information about the user-selected output data sources, and for displaying the actual flow, any part thereof or as a whole, by connecting input lines of input data sources and output lines of output data sources of the units of actual flow automatically;
   c) a plurality of dialog boxes for indicating a plurality of fields for said system data source, for displaying a plurality of current messages and for setting a plurality of flow items;
   d) a graphical user interface tool for designing a process for said plurality of units of actual flow using data about said input data sources and data about said output data sources;
   e) a process database for storing said designed process including said data about the input data sources and said data about the output data sources;
   whereby said development platform is configured for use with an existing applied database structure by mapping the structure of the actual flow automatically to the visual flow interface without program coding changes, such that designing of computer-based generic and visual enterprise management software is not dependent on the existing applied database structure.

2. The development platform of claim 1, wherein said platform is configured for use with an existing management information system, such that designing of computer-based generic and visual enterprise management software does not reciuire updating a new version of the existing management information system.

3. The development platform of claim 1, wherein said graphical user interface allows for design of flow lines representing input lines and output lines to connect a plurality of units of actual flow to be viewed using said visual flow interface.

4. The development platform of claim 1, further comprising a free grouping module for grouping a plurality of units of actual flow as an open group or isolating a single unit of actual flow as a closed group, whereby said free grouping module is designed using said graphical user interface and displayed on said visual flow interface.

5. The development platform of claim 1, further comprising a module for viewing a past process of units of actual flow recorded in said process database to be viewed in real time.

6. The development platform of claim 1, further comprising a simulation module for creating a production plan in real time.

7. The development platform of claim 1, wherein the existing database structure is configured for retrieval through Open Database Connectivity.

* * * * *